United States Patent
Hu

(10) Patent No.: US 11,829,038 B2
(45) Date of Patent: Nov. 28, 2023

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Shenzhen (CN)

(72) Inventor: Jianzhong Hu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 221 days.

(21) Appl. No.: 17/419,226

(22) PCT Filed: Dec. 28, 2020

(86) PCT No.: PCT/CN2020/140205
§ 371 (c)(1),
(2) Date: Jun. 28, 2021

(87) PCT Pub. No.: WO2021/169552
PCT Pub. Date: Sep. 2, 2021

(65) Prior Publication Data
US 2022/0404661 A1   Dec. 22, 2022

(30) Foreign Application Priority Data

Feb. 28, 2020 (CN) .......................... 202010126859.2

(51) Int. Cl.
*G02F 1/1339* (2006.01)
*G02F 1/1335* (2006.01)
*G02F 1/13357* (2006.01)

(52) U.S. Cl.
CPC .... *G02F 1/13398* (2021.01); *G02F 1/133512* (2013.01); *G02F 1/133608* (2013.01); *G02F 2201/123* (2013.01); *G02F 2202/02* (2013.01)

(58) Field of Classification Search
CPC ............. G02F 1/13396; G02F 1/13398; G02F 1/1339; G02F 1/136222; G02F 2202/02
See application file for complete search history.

(56) References Cited

U.S. PATENT DOCUMENTS 6,266,121 B1   7/2001 Shigeta et al.
2006/0244894 A1   11/2006 Yoon
(Continued)

FOREIGN PATENT DOCUMENTS

CN   101055353 A   10/2007
CN   101055353 B   8/2010
(Continued)

OTHER PUBLICATIONS

International Search Report in International application No. PCT/CN2020/140205, dated Mar. 16, 2021.
(Continued)

*Primary Examiner* — Angela K Davison
(74) *Attorney, Agent, or Firm* — PV IP PC; Wei Te Chung; Zhigang Ma

(57) ABSTRACT

The present application provides a liquid crystal display panel and a liquid crystal display device. The liquid crystal display panel, by disposing a support member between a support column and an organic material layer with a hardness of the support member being greater than that of the organic material layer, makes the support member perform a supporting function for the support column to prevent deformation accumulation of the support column and the organic material layer such that a liquid crystal border is more easily determined. In the meantime, the liquid crystal border is wider to mitigate a technical issue of the liquid crystal border of a conventional liquid crystal display panel being unable to be determined.

18 Claims, 4 Drawing Sheets

(56) References Cited

U.S. PATENT DOCUMENTS

| | | | |
|---|---|---|---|
| 2013/0005061 A1 | 1/2013 | Shim | |
| 2015/0002793 A1* | 1/2015 | Jin | G02F 1/1333 438/30 |
| 2020/0020722 A1* | 1/2020 | Huang | G02F 1/133516 |
| 2020/0124906 A1* | 4/2020 | Waka | G02F 1/1337 |

FOREIGN PATENT DOCUMENTS

| | | |
|---|---|---|
| CN | 102736311 A | 10/2012 |
| CN | 103413782 A | 11/2013 |
| CN | 103676336 A | 3/2014 |
| CN | 103926749 A | 7/2014 |
| CN | 105353567 A | 2/2016 |
| CN | 105807478 A | 7/2016 |
| CN | 207780438 U | 8/2018 |
| CN | 110376805 A | 10/2019 |
| CN | 111308793 A | 6/2020 |
| KR | 100687343 B1 | 2/2007 |

OTHER PUBLICATIONS

Written Opinion of the International Searching Authority in International application No. PCT/CN2020/140205, dated Mar. 16, 2021.

Chinese Office Action issued in corresponding Chinese Patent Application No. 202010126859.2 dated Jan. 27, 2021, pp. 1-8.

\* cited by examiner

LIQUID CRYSTAL DISPLAY PANEL AND LIQUID CRYSTAL DISPLAY DEVICE

RELATED APPLICATIONS

This application is a Notional Phase of PCT Patent Application No. PCT/CN2020/140205 having international filing date of Dec. 28, 2020, which claims the benefit of priority of Chinese Patent Application No. 202010126859.2 filed on Feb. 28, 2020. The contents of the above applications are all incorporated by reference as if fully set forth herein in their entirety.

FIELD OF INVENTION

The present application relates to a field of display technologies, especially to a liquid crystal display panel and a liquid crystal display device.

BACKGROUND OF INVENTION

A thin film transistor liquid crystal display (thin film transistor liquid crystal display device, TFT-LCD) is widely used due to its long lifespan, mature technology, and low price. In a liquid crystal display panel, an amount of liquid crystals has a great influence on display effect of the liquid crystal display panel. Therefore, when the liquid crystals in the liquid crystal display panel are set, a safe range will be set for the amount of liquid crystals, which is called liquid crystal border. When the amount of liquid crystals is higher than an upper limit of the liquid crystal border, display is uneven due to gravity, and when the amount of liquid crystals is lower than a lower limit of the liquid crystal border, vacuum bubbles appear. Factors that affect the liquid crystal border include a cumulative difference caused by a film thickness range of each film layer in the liquid crystal display panel, and a difference caused by impact of environmental changes on each film layer, the most important of which is an influence of a support column. For example, a change of height of the support column, compression by force of the support column, and rebound under low pressure, etc. In a small-sized liquid crystal display panel, due to a small area of the display panel, a cell thickness calculation is more accurate such that a value of the liquid crystal border is more stable. Therefore, the liquid crystal display panel can display normally. However, as the size of the display panel increases, various influence factors in the liquid crystal display panel are accumulated, and the liquid crystal border is difficult to determine. Meanwhile, the large-sized liquid crystal display panel would increase a thickness of an organic material layer in order to improve flatness of the display panel film layer. However, the organic material layer is easily affected by the environment, and it is more difficult to determine the liquid crystal border, which leads to display issues in the liquid crystal display panel.

Thus, the conventional liquid crystal display panel has the technical issue of not able to determine the liquid crystal border such that the liquid crystal display panel has a display issue.

SUMMARY OF INVENTION

Technical Issue

An embodiment of the present application provides a liquid crystal display panel and liquid crystal display device to ease a technical issue of a liquid crystal border of a conventional liquid crystal display panel cannot be determined such that the liquid crystal display panel has a display issue.

Technical Solution

To solve the above issue, the present application provides technical solutions as follows.

The embodiment of the present application provides a liquid crystal display panel, and the liquid crystal display panel comprises:
  a first substrate, comprising a first underlay, and an organic material layer disposed on the first underlay;
  a second substrate; and
  a liquid crystal layer disposed between the first substrate and the second substrate, wherein the liquid crystal layer comprises a support column, and the support column is disposed between the organic material layer and the second substrate;
  wherein a support member is disposed between the support column and the organic material layer, a hardness of the support member is greater than a hardness of the organic material layer.

In some embodiments, the first substrate comprises a pixel electrode layer, the pixel electrode layer is patterned to form a pixel electrode and the support member.

In some embodiments, material of the support member comprises indium tin oxide.

In some embodiments, a thickness of the support member ranges from 700 Å to 900 Å.

In some embodiments, the first substrate comprises a pixel electrode layer and a support member formation layer, the pixel electrode layer is patterned to form a pixel electrode, and the support member formation layer is patterned to form the support member.

In some embodiments, the first substrate further comprises a thin film transistor layer, the thin film transistor layer is disposed on the first underlay, and the second substrate comprises a black matrix layer, a color resist layer, and a second underlay.

In some embodiments, the first substrate further comprises a thin film transistor layer and a color resist layer, the thin film transistor layer is disposed on the first underlay, the color resist layer is disposed on the thin film transistor layer, and the second substrate comprises a black matrix layer and a second underlay.

In some embodiments, the support column comprises a main support column and a sub-support column, and the support member is disposed between the main support column and the organic material layer.

In some embodiments, the support column comprises a main support column and a sub-support column, the support member is disposed between the main support column and the organic material layer, and the support member is disposed between the sub-support column and the organic material layer.

In some embodiments, the liquid crystal display panel comprises a red color resist, a blue color resist, and a green color resist, and in a region corresponding to the blue color resist, the support member is disposed between the support column and the organic material layer.

In some embodiments, in a region corresponding to the green color resist and the red color resist, the support member is disposed between the support column and the organic material layer.

In some embodiments, in a region corresponding to the support column, an auxiliary layer is disposed under the organic material layer.

In some embodiments, material of the auxiliary layer comprises indium tin oxide.

In some embodiments, a width of the support member is greater than or equal to a width of the support column.

At the same time, the embodiment of the present application provides a liquid crystal display device, and the liquid crystal display device comprises:

a backlight module; and a liquid crystal display panel disposed along a light emitting direction of the backlight module, wherein the liquid crystal display panel comprises a first substrate, a second substrate, and a liquid crystal layer, the first substrate comprises a first underlay and an organic material layer disposed on the first underlay, the liquid crystal layer is disposed between the first substrate and the second substrate, the liquid crystal layer comprises a support column, the support column is disposed between the organic material layer and the second substrate, wherein a support member is disposed between the support column and the organic material layer, and a hardness of the support member is greater than a hardness of the organic material layer.

In an embodiment, the first substrate comprises a pixel electrode layer, the pixel electrode layer is patterned to form a pixel electrode and the support member.

In an embodiment, material of the support member comprises indium tin oxide.

In an embodiment, a thickness of the support member ranges from 700 Å to 900 Å.

In an embodiment, the first substrate comprises a pixel electrode layer and a support member formation layer, the pixel electrode layer is patterned to form a pixel electrode, and the support member formation layer is patterned to form the support member.

In an embodiment, the first substrate further comprises a thin film transistor layer and a color resist layer, the thin film transistor layer is disposed on the first underlay, the color resist layer is disposed on the thin film transistor layer, and the second substrate comprises a black matrix layer and a second underlay.

Advantages

The embodiment of the present application provides a liquid crystal display panel and a liquid crystal display device, and the liquid crystal display panel comprises a first substrate, a second substrate, and a liquid crystal layer. The first substrate comprises a first underlay and an organic material layer disposed on the first underlay. The liquid crystal layer is disposed between the first substrate and the second substrate. The liquid crystal layer comprises a support column, and the support column is disposed between the organic material layer and the second substrate. A support member is disposed between the support column and the organic material layer, and a hardness of the support member is greater than a hardness of the organic material layer. By disposing the support member between the support column and the organic material layer with the hardness of the support member being greater than the hardness of the organic material layer, the support member performs a supporting function for the support column, which prevents deformation accumulation between the support column and the organic material layer such that a liquid crystal border is more easily determined. In the meantime, the liquid crystal border is broader, which eases the technical issue of the conventional liquid crystal display panel having the liquid crystal border unable to be determined, resulting in a display issue of the liquid crystal display panel.

DETAILED DESCRIPTION OF PREFERRED EMBODIMENTS

The present application provides a liquid crystal display panel and liquid crystal display device. To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

The embodiment of the present application aims at the technical issue that the conventional liquid crystal display panel has a liquid crystal border unable to be determined, which results in a display issue of the liquid crystal display panel. The embodiment of the present application is configured to mitigate the issue.

Figure 1:
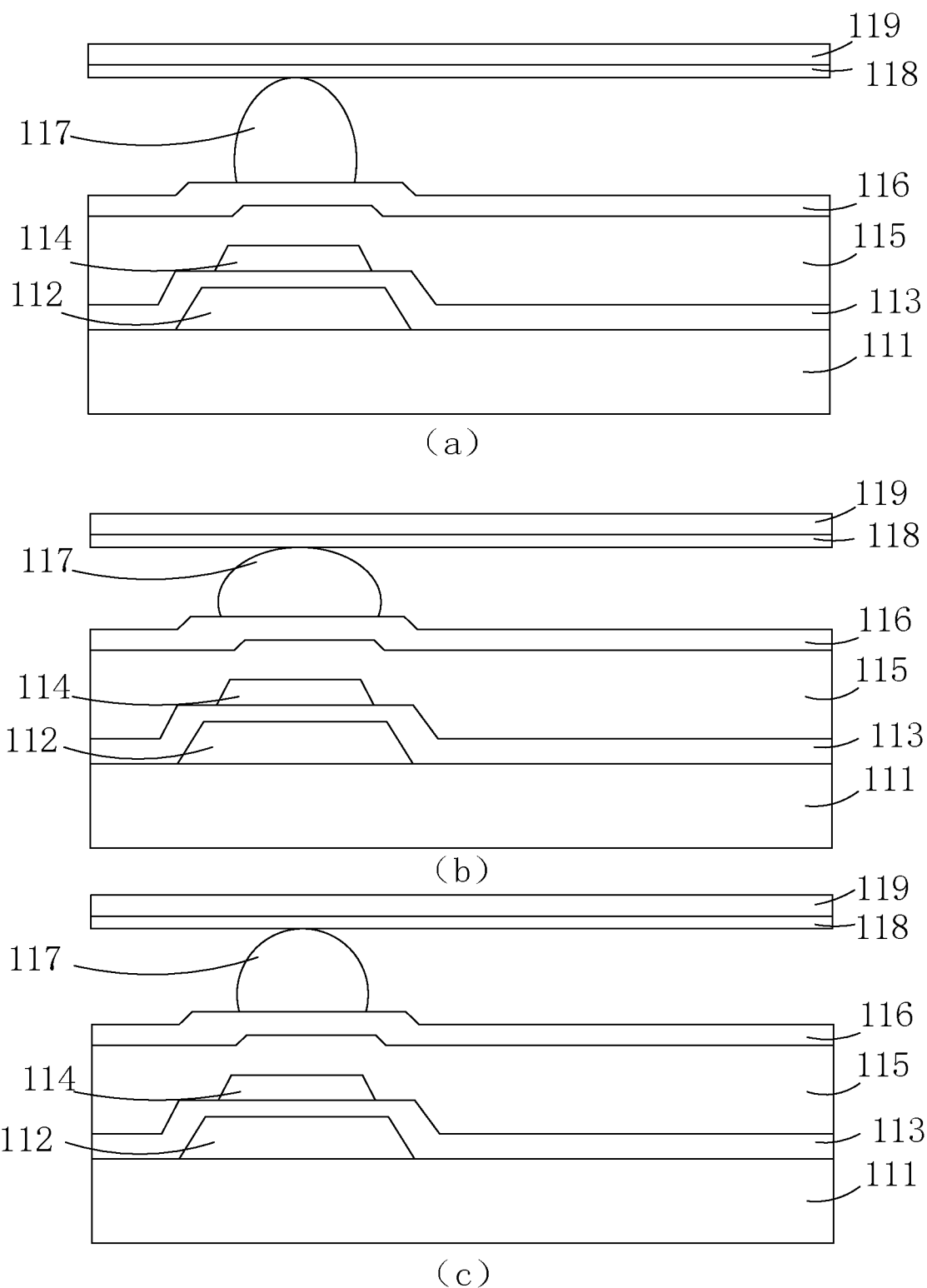
FIG. 1 is a first schematic view of a conventional liquid crystal display panel.
Figure 2:
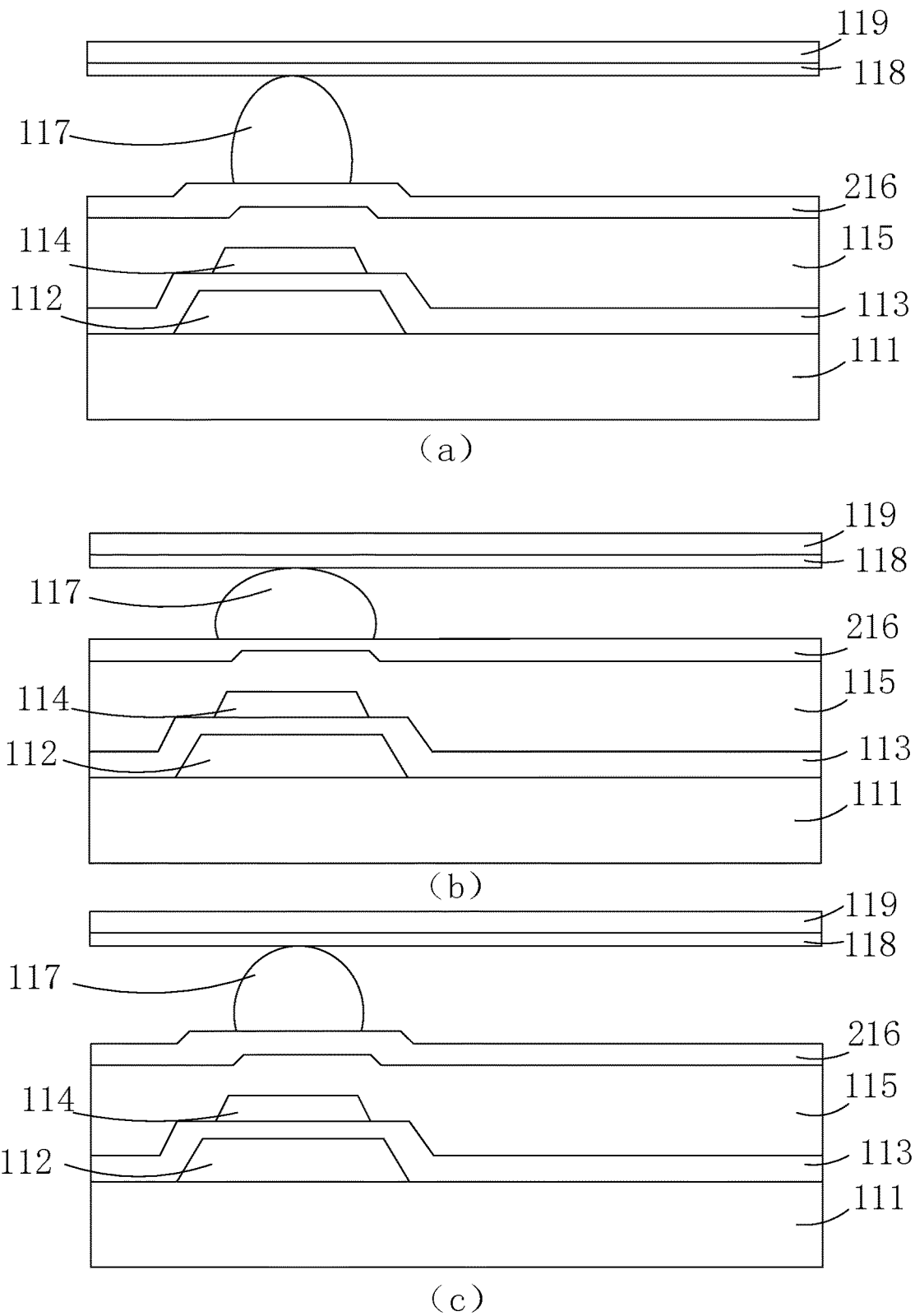
FIG. 2 is a second schematic view of the conventional liquid crystal display panel.

With reference to FIG. 1, a liquid crystal display panel in conventional products comprises a first glass substrate 111, a first metal layer 112, a gate insulating layer 113, a second metal layer 114, a color resist layer 115, a passivation layer 116, a support column 117, a black matrix layer 118, and a second glass substrate 119. As shown in (a) of FIG. 1, under normal temperature and pressure, the support column is compressed due to gravity. As shown in (b) of FIG. 1, under low temperature and normal pressure, the support column contracts in cold, and the passivation layer does not contract. As shown in (c) of FIG. 1, under low temperature and low pressure, the support column rebounds, and the passivation layer does not change such that a lower limit of the liquid crystal border is acquired. Because in the conventional products, only the support column changes, the liquid crystal border is broader and more stable. In in large size products, to solve some display issues, with reference to FIG. 2, an organic material layer 216 is disposed to replace the passivation layer. As shown in (a) of FIG. 2, under normal temperature and pressure, the support column and the organic material layer are compressed. As shown in (b) of FIG. 2, under low temperature and normal pressure, the support column and organic material layer contract simultaneously. As shown in (c) of FIG. 2, under low temperature and pressure, the support column and the organic material layer rebound simultaneously. The support column and the organic material layer contract simultaneously and rebound simultaneously, and elastic recovery rates of the organic material layer and the support column are different such that the liquid crystal border is narrower and is hard to determine. During manufacturing processes, a slight change in the thickness of a film layer may cause display issues, i.e., the technical issue of the liquid crystal border of the liquid crystal display panel unable to be determined, resulting in a display issue of the liquid crystal display panel.

Figure 3:
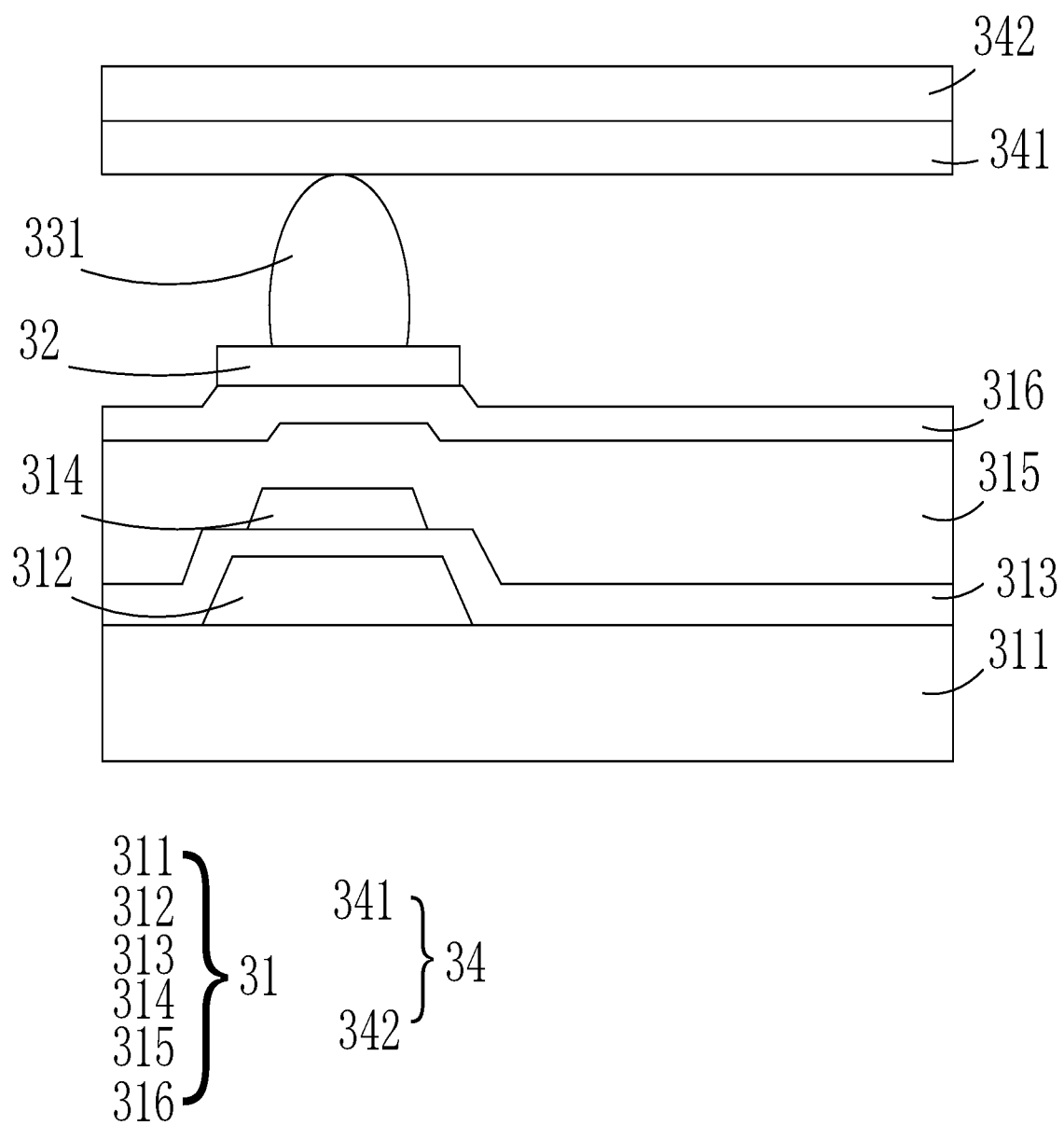
FIG. 3 is a schematic view of a liquid crystal display panel provided by an embodiment of the present application.

With reference to FIG. 3, the embodiment of the present application provides a liquid crystal display panel, and the liquid crystal display panel comprises:

- a first substrate 31, comprising a first underlay 311 and an organic material layer 316 disposed on the first underlay 311;
- a second substrate 34; and
- a liquid crystal layer disposed between the first substrate 31 and the second substrate 34, wherein the liquid crystal layer comprises a support column 331, and the support column 331 is disposed between the organic material layer 316 and the second substrate 34;
- wherein a support member 32 is disposed between the support column 331 and the organic material layer 316, and a hardness of the support member is greater than a hardness of the organic material layer.

The embodiment of the present application provides a liquid crystal display panel, and the liquid crystal display panel comprises a first substrate, a second substrate, and a liquid crystal layer. The first substrate comprises a first underlay and an organic material layer disposed on the first underlay. The liquid crystal layer is disposed between the first substrate and the second substrate. The liquid crystal layer comprises a support column, and the support column is disposed between the organic material layer and the second substrate. A support member is disposed between the support column and the organic material layer, and a hardness of the support member is greater than a hardness of the organic material layer. By disposing the support member between the support column and the organic material layer with the hardness of the support member being greater than the hardness of the organic material layer, the support member performs a supporting function for the support column, which prevents deformation accumulation between the support column and the organic material layer such that a liquid crystal border is more easily determined. In the meantime, the liquid crystal border is broader, which eases the technical issue of the conventional liquid crystal display panel having the liquid crystal border unable to be determined, resulting in a display issue of the liquid crystal display panel.

In an embodiment, the first substrate comprises a pixel electrode layer, the pixel electrode layer is patterned to form a pixel electrode and the support member. During disposing the support member, the pixel electrode layer is employed to form the support member such that no additional film layer is needed when the support member is manufactured and formed, and the support member is formed directly by the pixel electrode layer, which lowers the difficulty of the process. Furthermore, the support member performs an isolation function to the organic material layer and support column to prevent accumulation of deformation of the thickness of the organic material layer and variation of the thickness of support column, and performs a supporting function for the support column such that the deformation amount is more stable and the liquid crystal border is more easily determined, which prevents the display issue of the liquid crystal display panel.

In an embodiment, material of the support member comprises indium tin oxide. Because indium tin oxide is a crystal structure and has a hardness greater than that of the organic material layer, using indium tin oxide as a bottom pad and forming the support column on indium tin oxide can reduce compression and rebound of the organic material layer to reduce accumulation of deformation of the organic material layer and deformation of the support column such that instability of the liquid crystal border is lowered, and the liquid crystal border is more easily determined to make the liquid crystal display panel display normally. Furthermore, forming indium tin oxide on the thin film transistor would not affect channel characteristics of the thin film transistor and would not influence normal work of the thin film transistors.

In an embodiment, a thickness of the support member ranges from 700 Å to 900 Å. Specifically, the thickness of the support member is 800 Å. When disposed, the support member can be disposed by reducing the thickness of the organic material layer, which would not increase the thickness of the liquid crystal display panel. Furthermore, the thickness of indium tin oxide is less compared to the passivation layer so the thickness of the liquid crystal display panel is less.

In an embodiment, the first substrate comprises a pixel electrode layer and a support member formation layer. The pixel electrode layer is patterned to form a pixel electrode, and the support member formation layer is patterned to form the support member. When the support member is disposed, a layer of a support member formation layer can be added to make the pixel electrode layer and the support member form the pixel electrode and the support member, respectively, such that a manufacturing method for the pixel electrode layer needs no changes. Furthermore, a support member formation layer is further added such that changing parameters such as thickness and width of the support member is easier and would not influence the circuit in the liquid crystal display panel.

In an embodiment, the first substrate further comprises a thin film transistor layer, and the thin film transistor layer is disposed on the first underlay. The second substrate comprises a black matrix layer, a color resist layer, and a second underlay. For the liquid crystal display panel comprising the array substrate and color filter substrate, disposing the support member between support column and organic material layer makes a deformation amount of the support column be more easily determined such that the liquid crystal display panel displays normally.

In an embodiment, with reference to FIG. 3, the first substrate 31 further comprises a thin film transistor layer and a color resist layer 315. The thin film transistor layer is disposed on the first underlay 311. The color resist layer 315 is disposed on the thin film transistor layer. The second substrate 34 comprises a black matrix layer 341 and a second underlay 342. The thin film transistor layer comprises a first metal layer 312, a gate insulating layer 313, and a second metal layer 314. For the liquid crystal display panel including the first substrate being a color on array (COA, which means a color filter layer disposed on an array layer) substrate, disposing the support member between the support column and the organic material layer makes the liquid crystal border of the liquid crystal display panel with the COA substrate be more easily determined such that the liquid crystal display panel including the COA substrate displays normally.

In an embodiment, the support column comprises a main support column and a sub-support column. The support member is disposed between the main support column and the organic material layer. For the liquid crystal display panel including the main support column and sub-support column, the support member can be disposed between the main support column and the organic material layer to make deformation of the main support column more stable and the liquid crystal border be more easily determined such that the liquid crystal display panel displays normally.

In an embodiment, the support column comprises a main support column and a sub-support column, the support member is disposed between the main support column and the organic material layer, and the support member is disposed between the sub-support column and the organic material layer. For the liquid crystal display panel including the main support column and the sub-support column, by disposing the support member under the main support column and the sub-support column, the support member prevents accumulation of deformation of the support column and deformation of the organic material layer such that the liquid crystal border is more stable and more easily determined to make the liquid crystal display panel display normally.

In an embodiment, the liquid crystal display panel comprises a red color resist, a blue color resist, and a green color resist. In a region corresponding to the blue color resist, the support member is disposed between the support column and the organic material layer. For the liquid crystal display panel having the array substrate and the color filter substrate, or for the liquid crystal display panel having the COA substrate, the support member can be disposed between the support column and the organic material layer in the region corresponding to the blue color resist, such that a deformation amount of the support column of the region corresponding to the blue color resist is more stable to make the liquid crystal border be more easily determined and to make the liquid crystal display panel display normally.

In an embodiment, in a region corresponding to the green color resist and the red color resist, a support member is disposed between the support column and the organic material layer. Besides the support member disposed between the support column and the organic material layer in the region corresponding to the blue color resist, the support member is also disposed between the support column and the organic material layer in the region corresponding to the green color resist and the red color resist such that the support members are disposed under the support columns of the regions corresponding to color resist layer to make the liquid crystal display panel display normally.

In an embodiment, in a region corresponding to the support column, an auxiliary layer is disposed under the organic material layer. Disposing the auxiliary layer under the organic material layer makes the auxiliary layer able to further support the support column, and to support the organic material layer such that deformation of the support column is more stable and deformation of the organic material layer is more stable to make the liquid crystal border be more easily determined, which makes the liquid crystal display panel display normally.

In an embodiment, material of the auxiliary layer comprises indium tin oxide.

Employing indium tin oxide for support has a better supporting effect and would not affect performance of the liquid crystal display panel.

In an embodiment, a width of the support member is greater than or equal to a width of the support column. By making the width of the support member greater than or equal to the width of the support column, all parts of the support column are disposed on the support member to support the entire support column such that deformation of the support column is stable to make the liquid crystal display panel display normally.

Figure 4:
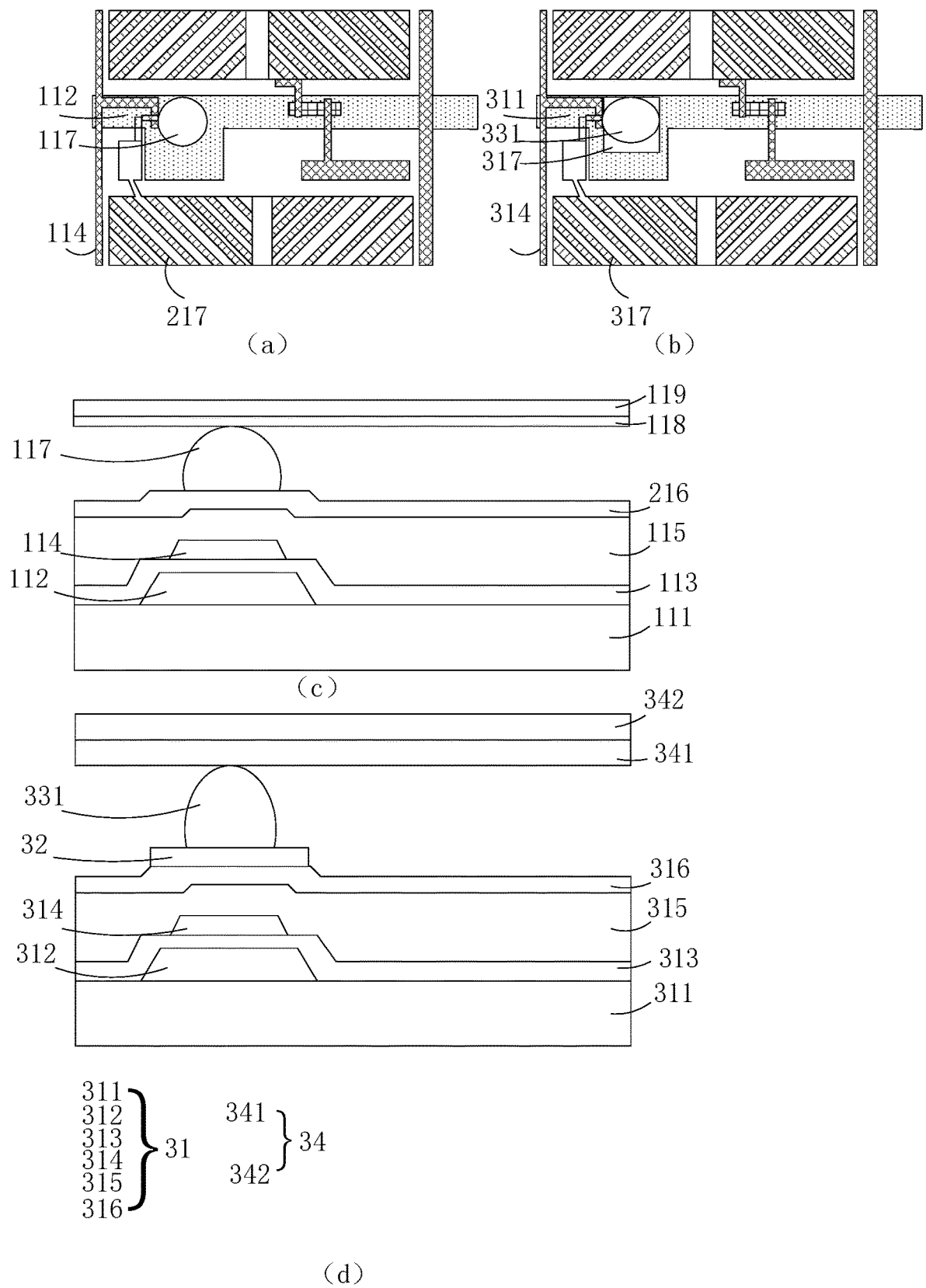
FIG. 4 is a comparison view of between the conventional liquid crystal display panel and the liquid crystal display panel provided by the embodiment of the present application.

In an embodiment, with reference to FIG. 4, a plane perspective view of a conventional liquid crystal display panel is as shown in (a) of FIG. 4, and a cross-sectional view of the conventional liquid crystal display panel is as shown in (c) of FIG. 4. A plane perspective view of the liquid crystal display panel provided by the embodiment of the present application is as shown in (b) of FIG. 4, and a cross-sectional view of the liquid crystal display panel provided by the embodiment of the present application is as shown in (d) of FIG. 4. The liquid crystal display panel in (a) of FIG. 4 comprises a pixel electrode layer 217. The liquid crystal display panel in (b) of FIG. 4 comprises a pixel electrode layer 317. It can be seen through FIG. 4 that the embodiment of the present application, by disposing the support member under the support column, prevents accumulation of deformation of the organic material layer and the support column to make the liquid crystal border more stable such that the liquid crystal display panel displays normally.

The embodiment of the present application provides a liquid crystal display device, and the liquid crystal display device comprises:
a backlight module; and
a liquid crystal display panel disposed along a light emitting direction of the backlight module, wherein the liquid crystal display panel comprises a first substrate, a second substrate, and a liquid crystal layer, the first substrate comprises a first underlay and an organic material layer disposed on the first underlay, the liquid crystal layer is disposed between the first substrate and the second substrate, the liquid crystal layer comprises a support column, the support column is disposed between the organic material layer and the second substrate, wherein a support member is disposed between the support column and the organic material layer, and a hardness of the support member is greater than a hardness of the organic material layer.

The embodiment of the present application provides a liquid crystal display device, the liquid crystal display device comprises a liquid crystal display panel and a backlight module, the liquid crystal display panel is disposed along a light emitting direction of the backlight module, and the liquid crystal display panel comprises a first substrate, a second substrate, and a liquid crystal layer. The first substrate comprises a first underlay and an organic material layer disposed on the first underlay. The liquid crystal layer is disposed between the first substrate and the second substrate. The liquid crystal layer comprises a support column, and the support column is disposed between the organic material layer and the second substrate. A support member is disposed between the support column and the organic material layer, and a hardness of the support member is greater than a hardness of the organic material layer. By disposing the support member between the support column and the organic material layer with the hardness of the support member being greater than the hardness of the organic material layer, the support member performs a supporting function for the support column, which prevents deformation accumulation between the support column and the organic material layer such that a liquid crystal border is more easily determined. In the meantime, the liquid crystal border is broader, which eases the technical issue of the conventional liquid crystal display panel having the liquid crystal border unable to be determined, resulting in a display issue of the liquid crystal display panel.

In an embodiment, in the liquid crystal display device, the first substrate comprises a pixel electrode layer, the pixel electrode layer is patterned to form a pixel electrode and the support member.

In an embodiment, in the liquid crystal display device, material of the support member comprises indium tin oxide.

In an embodiment, in the liquid crystal display device, a thickness of the support member ranges from 700 Å to 900 Å.

In an embodiment, in the liquid crystal display device, the first substrate comprises a pixel electrode layer and a support member formation layer, the pixel electrode layer is patterned to form a pixel electrode, and the support member formation layer is patterned to form the support member.

In an embodiment, the first substrate further comprises a thin film transistor layer and a color resist layer, the thin film transistor layer is disposed on the first underlay, the color resist layer is disposed on the thin film transistor layer, and the second substrate comprises a black matrix layer and a second underlay.

According to the above embodiments, the following can be known:

The embodiment of the present application provides a liquid crystal display panel and a liquid crystal display device, and the liquid crystal display panel comprises a first substrate, a second substrate, and a liquid crystal layer. The first substrate comprises a first underlay and an organic material layer disposed on the first underlay. The liquid crystal layer is disposed between the first substrate and the second substrate. The liquid crystal layer comprises a support column, and the support column is disposed between the organic material layer and the second substrate. A support member is disposed between the support column and the organic material layer, and a hardness of the support member is greater than a hardness of the organic material layer. By disposing the support member between the support column and the organic material layer with the hardness of the support member being greater than the hardness of the organic material layer, the support member performs a supporting function for the support column, which prevents deformation accumulation between the support column and the organic material layer such that a liquid crystal border is more easily determined. In the meantime, the liquid crystal border is broader, which eases the technical issue of the conventional liquid crystal display panel having the liquid crystal border unable to be determined, resulting in a display issue of the liquid crystal display panel.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A liquid crystal display panel, comprising:
   a first substrate, comprising a first underlay, and an organic material layer disposed on the first underlay;
   a second substrate; and
   a liquid crystal layer disposed between the first substrate and the second substrate, wherein the liquid crystal layer comprises a support column, and the support column is disposed between the organic material layer and the second substrate;
   wherein a support member is disposed between the support column and the organic material layer, and a hardness of the support member is greater than a hardness of the organic material layer;
   wherein a thickness of the support member ranges from 700 Å to 900 Å.

2. The liquid crystal display panel according to claim 1, wherein the first substrate comprises a pixel electrode layer and a support member formation layer, the pixel electrode layer is patterned to form a pixel electrode, and the support member formation layer is patterned to form the support member.

3. The liquid crystal display panel according to claim 1, wherein the first substrate further comprises a thin film transistor layer, the thin film transistor layer is disposed on the first underlay, and the second substrate comprises a black matrix layer, a color resist layer, and a second underlay.

4. The liquid crystal display panel according to claim 1, wherein the first substrate further comprises a thin film transistor layer and a color resist layer, the thin film transistor layer is disposed on the first underlay, the color resist layer is disposed on the thin film transistor layer, and the second substrate comprises a black matrix layer and a second underlay.

5. The liquid crystal display panel according to claim 1, wherein the support column comprises a main support column and a sub-support column, and the support member is disposed between the main support column and the organic material layer.

6. The liquid crystal display panel according to claim 1, wherein the support column comprises a main support column and a sub-support column, the support member is disposed between the main support column and the organic material layer, and the support member is disposed between the sub-support column and the organic material layer.

7. The liquid crystal display panel according to claim 1, wherein a width of the support member is greater than or equal to a width of the support column.

8. The liquid crystal display panel according to claim 1, wherein the first substrate comprises a pixel electrode layer, and the pixel electrode layer is patterned to form a pixel electrode and the support member.

9. The liquid crystal display panel according to claim 8, wherein material of the support member comprises indium tin oxide.

10. The liquid crystal display panel according to claim 1, wherein the liquid crystal display panel comprises a red color resist, a blue color resist, and a green color resist, and in a region corresponding to the blue color resist, the support member is disposed between the support column and the organic material layer.

11. The liquid crystal display panel according to claim 10, wherein in a region corresponding to the green color resist and the red color resist, the support member is disposed between the support column and the organic material layer.

12. The liquid crystal display panel according to claim 1, wherein in a region corresponding to the support column, an auxiliary layer is disposed under the organic material layer.

13. The liquid crystal display panel according to claim 12, wherein material of the auxiliary layer comprises indium tin oxide.

14. A liquid crystal display device, comprising:
    a backlight module; and
    a liquid crystal display panel disposed along a light emitting direction of the backlight module, wherein the liquid crystal display panel comprises a first substrate, a second substrate, and a liquid crystal layer; the first substrate comprises a first underlay and an organic material layer disposed on the first underlay, the liquid crystal layer is disposed between the first substrate and the second substrate, the liquid crystal layer comprises a support column, and the support column is disposed between the organic material layer and the second substrate, wherein a support member is disposed between the support column and the organic material layer, and a hardness of the support member is greater than a hardness of the organic material layer;

wherein a thickness of the support member ranges from 700 Å to 900 Å.

15. The liquid crystal display device according to claim 14, wherein the first substrate comprises a pixel electrode layer and a support member formation layer, the pixel electrode layer is patterned to form a pixel electrode, and the support member formation layer is patterned to form the support member.

16. The liquid crystal display device according to claim 14, wherein the first substrate further comprises a thin film transistor layer and a color resist layer, the thin film transistor layer is disposed on the first underlay, the color resist layer is disposed on the thin film transistor layer, and the second substrate comprises a black matrix layer and a second underlay.

17. The liquid crystal display device according to claim 14, wherein the first substrate comprises a pixel electrode layer, and the pixel electrode layer is patterned to form a pixel electrode and the support member.

18. The liquid crystal display device according to claim 17, wherein material of the support member comprises indium tin oxide.

* * * * *